June 11, 1935.    E. A. DEWALD    2,004,387
MANUFACTURE OF FINNED TUBING
Filed Aug. 7, 1931    7 Sheets-Sheet 1
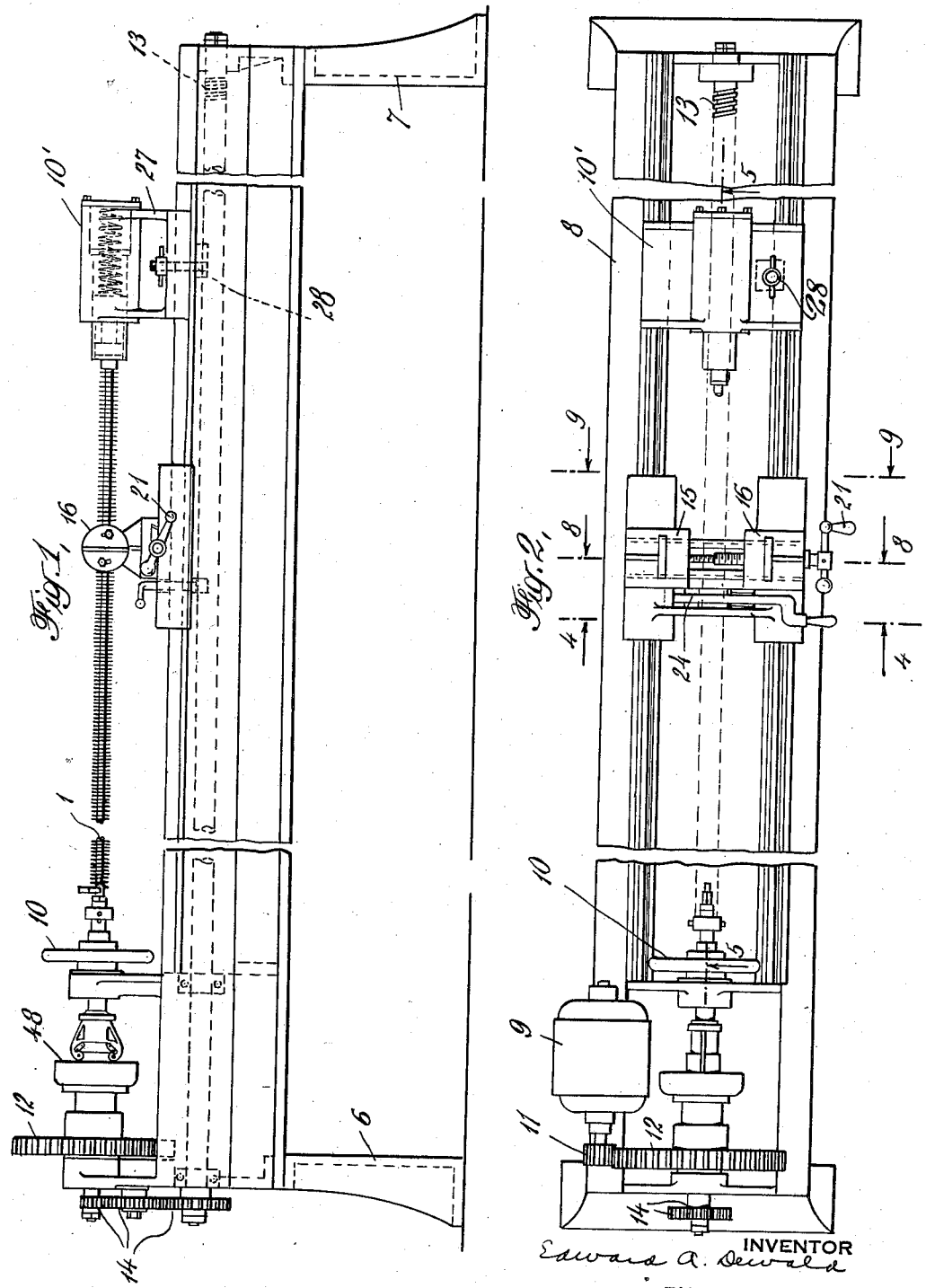
INVENTOR
Edward A. Dewald
BY
Pennie, Davis, Marvin, Edmonds
his ATTORNEYS June 11, 1935. E. A. DEWALD 2,004,387
MANUFACTURE OF FINNED TUBING
Filed Aug. 7, 1931 7 Sheets-Sheet 2
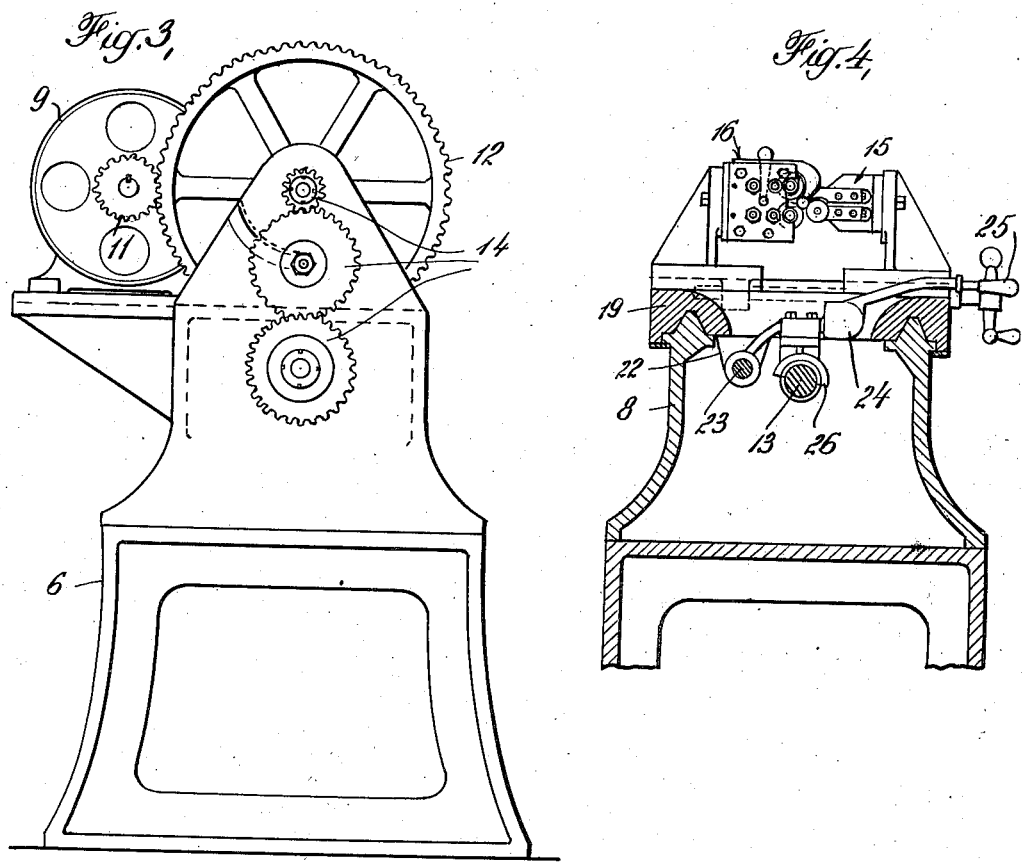
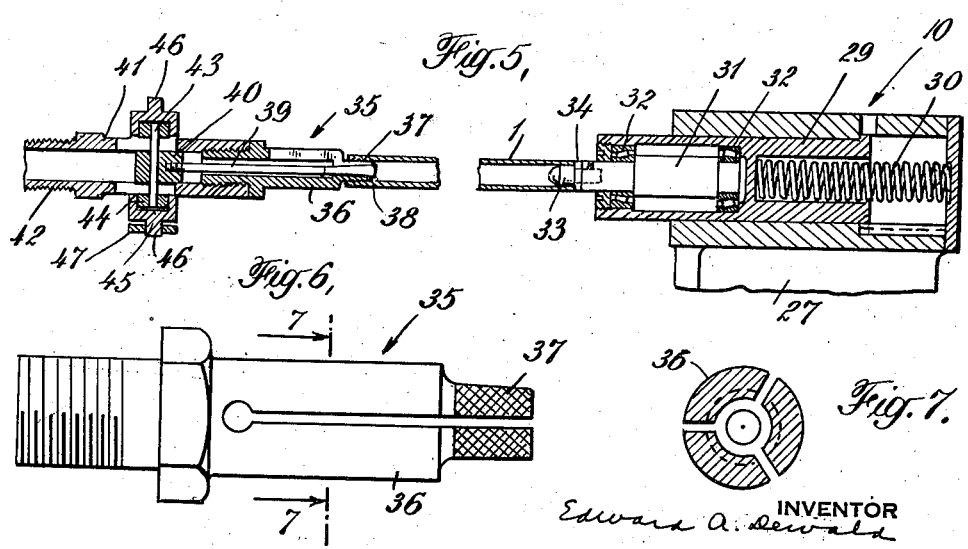
INVENTOR
Edward A. Dewald
BY Pennie, Davis, Marvin & Edmonds
his ATTORNEYS

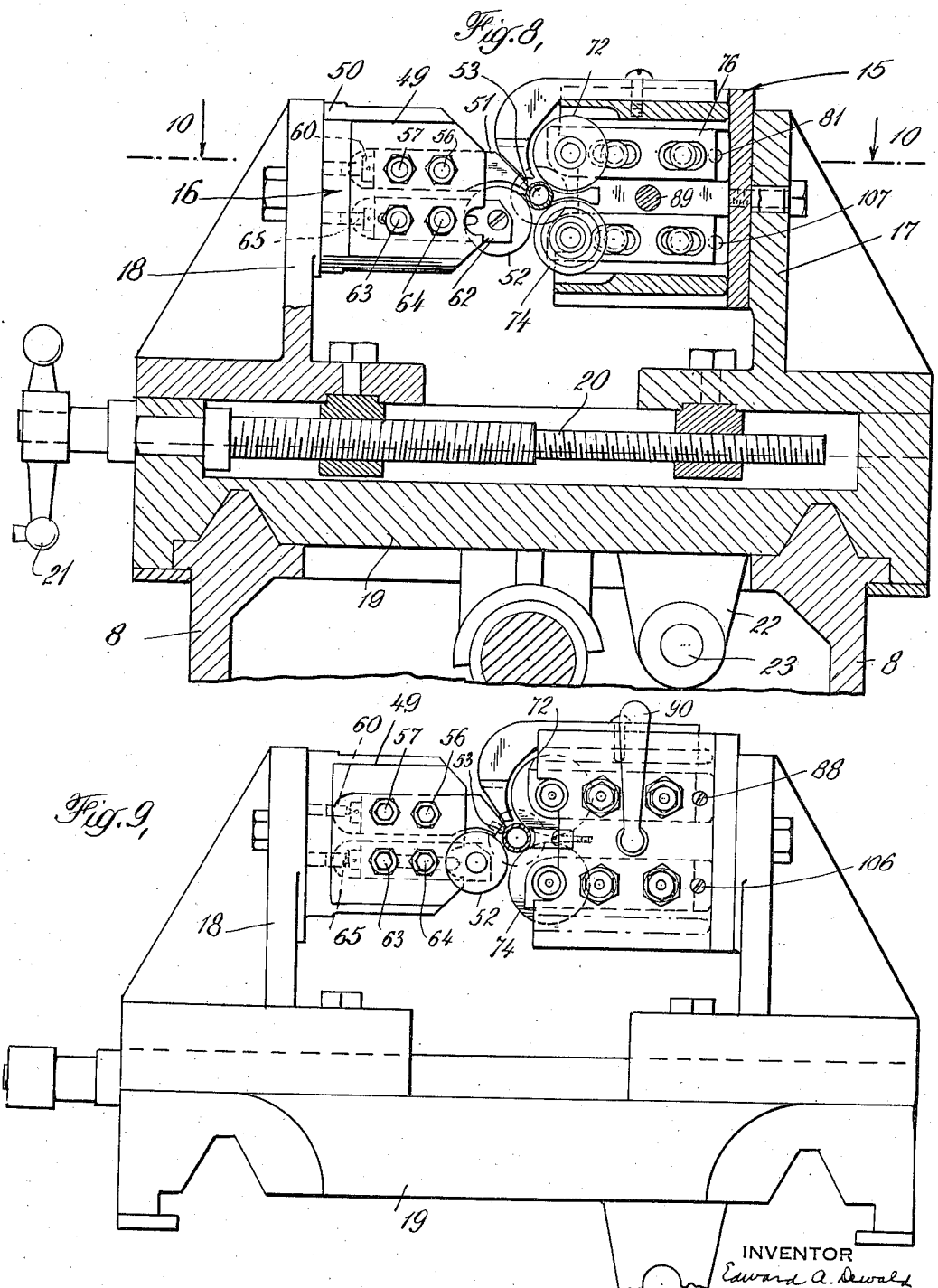

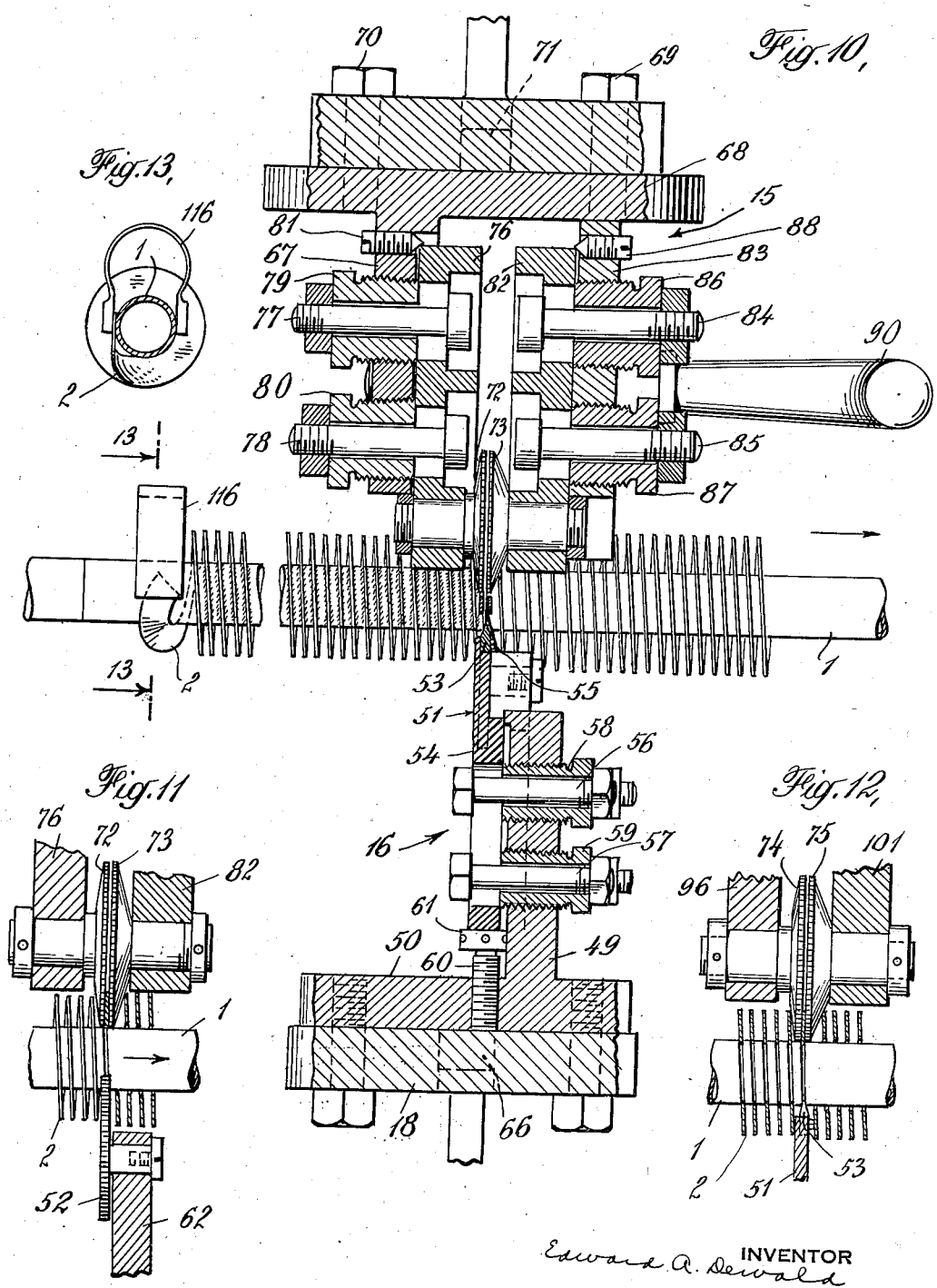

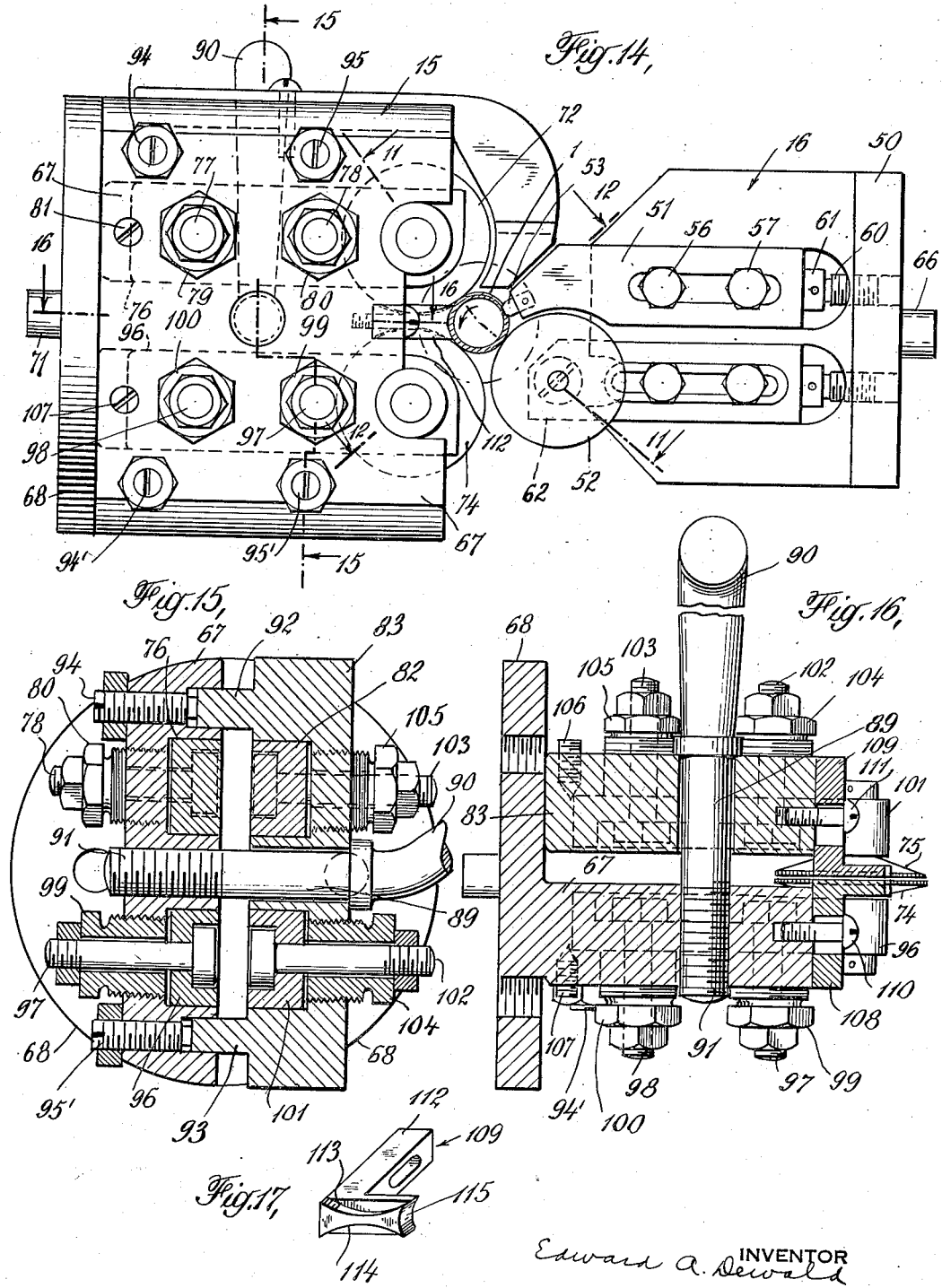

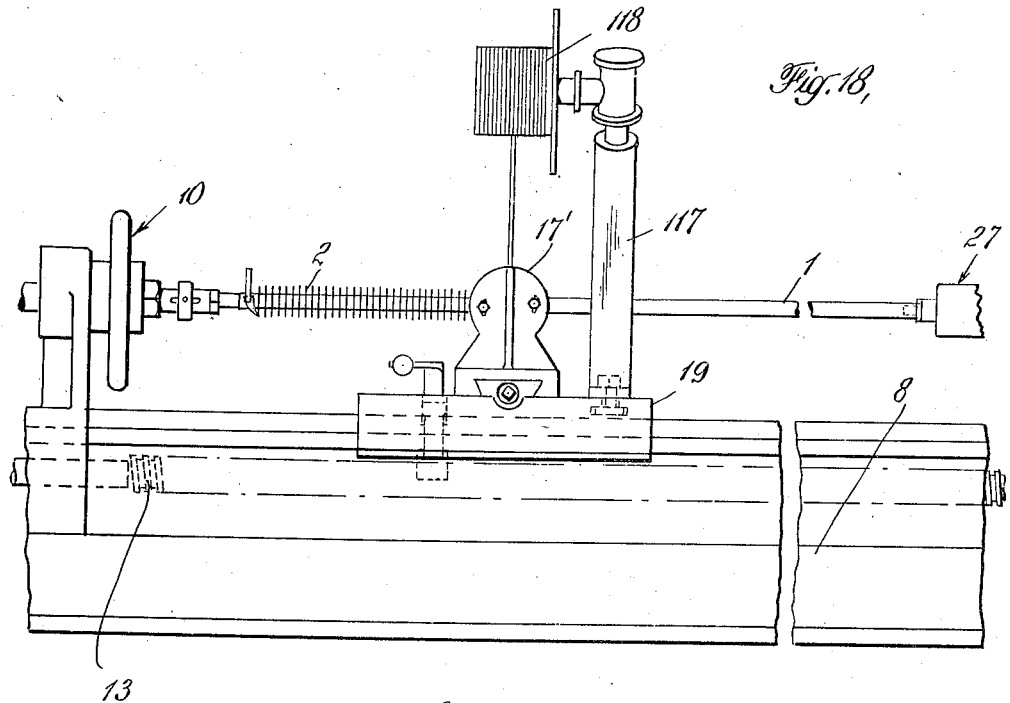
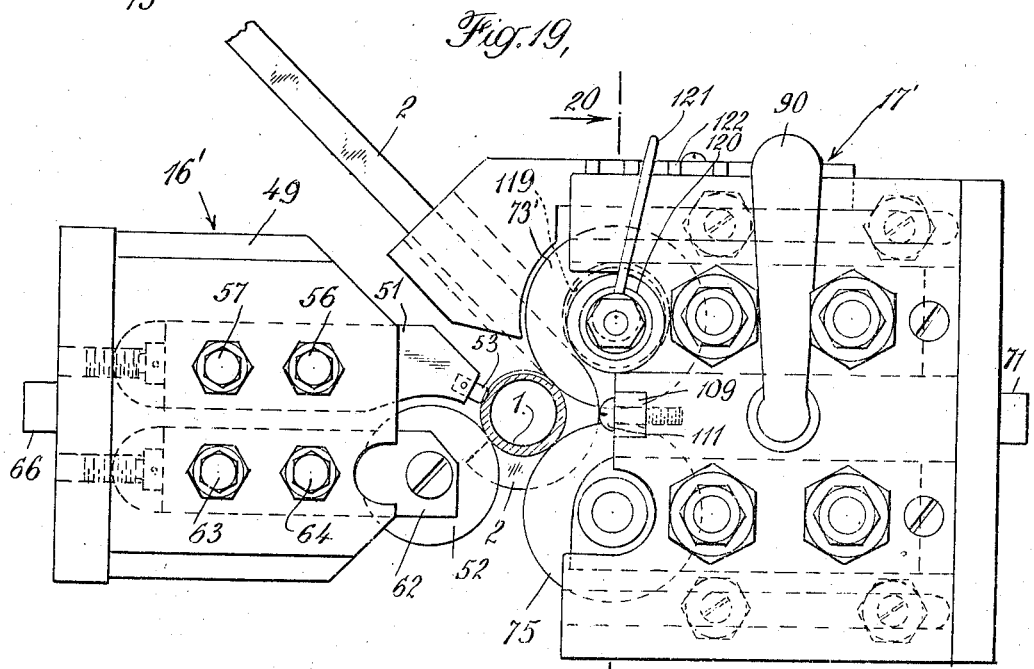

June 11, 1935.  E. A. DEWALD  2,004,387
MANUFACTURE OF FINNED TUBING
Filed Aug. 7, 1931  7 Sheets-Sheet 7
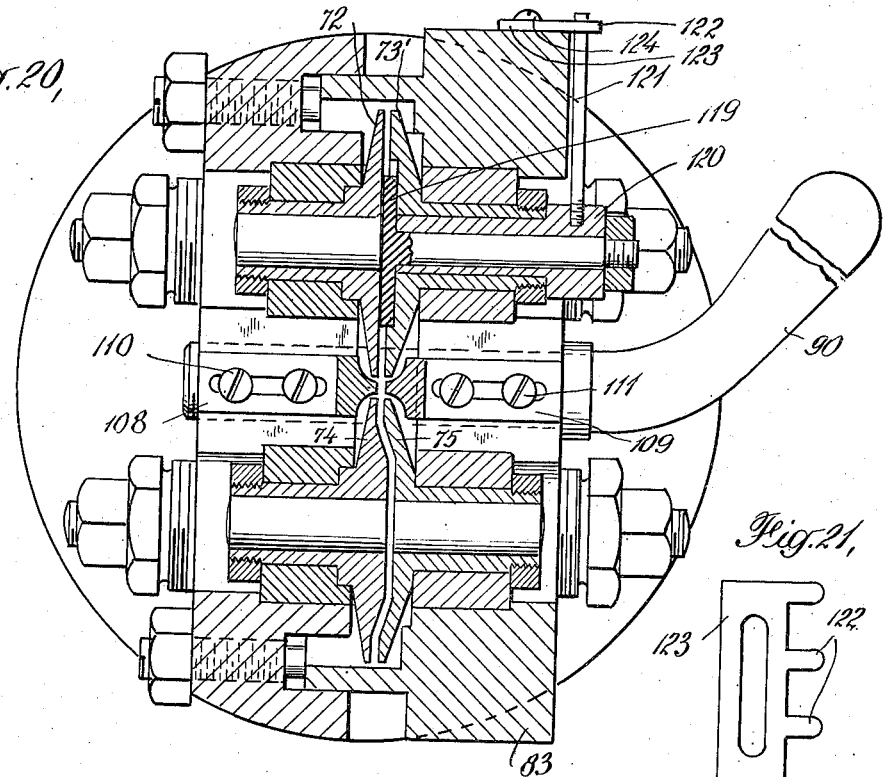
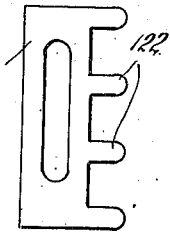
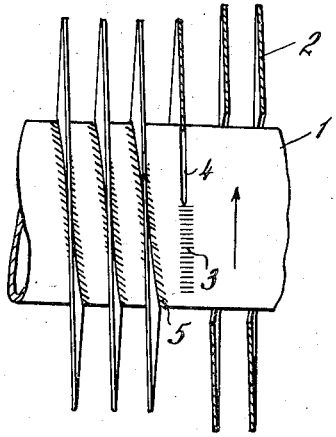
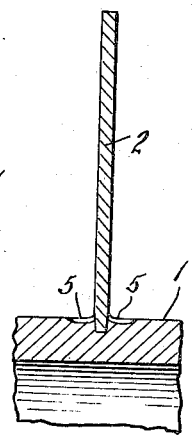
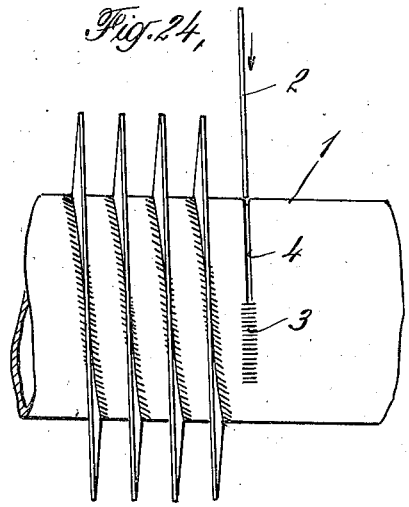
INVENTOR
Edward A. Dewald
BY
Pennie, Davis, Marvin & Edmonds
his ATTORNEYS Patented June 11, 1935

2,004,387

UNITED STATES PATENT OFFICE 2,004,387

MANUFACTURE OF FINNED TUBING

Edward A. Dewald, Massillon, Ohio, assignor to The Griscom-Russell Company, New York, N. Y., a corporation of Delaware Application August 7, 1931, Serial No. 555,718

4 Claims. (Cl. 29—157.3)

This invention relates to the manufacture of finned tubing and comprises an improved method for making this product. The finned tubing comprises a metal tube having secured to the external surface thereof a thin metal fin in the form of a helix. Such finned tubing is of great utility in the manufacture of heat exchangers.

According to one embodiment of my invention a preformed helical coil of metal ribbon is progressively secured to a metal tube inserted into the preformed coil. A method and apparatus for coiling the ribbon are described and claimed in my copending application Serial Number 403,193, filed October 29, 1929, which has since issued as Patent No. 1,898,233. After the coil of metal ribbon has been formed it is preferably annealed and then a metal tube is inserted into the coil and the coil is progressively secured to the tube. One end of the coiled metal ribbon may be secured to the tube near one end thereof, a groove is formed in the surface of the tube, the tube is turned to draw the coil progressively into the groove, and the ribbon is then anchored in the groove by crimping the edges of the same into firm contact with the lower side edges of the metal ribbon. My improved apparatus for performing this operation comprises a machine of the lathe type having adjustable tool heads, one of which carries a roughening roll and a scoring tool and the other of which carries a pair of lead rolls for guiding the metal ribbon into the groove formed by the scoring tool, and a pair of knurling rolls for crimping the edges of the groove into firm contact with the lower edge of the ribbon. These several rolls and the scoring tool are independently adjustable and the tool heads are mounted so that the lead screw of the lathe causes them to advance along the tube from one end thereof to the other. The tube is rotated with respect to the tool heads and the precoiled ribbon is thus progressively anchored to the tube.

According to another embodiment of my invention a metal ribbon is withdrawn from a reel, or other suitable source of supply, and wound directly onto the tube in the form of a helix, the ribbon being anchored to the tube as the helix is formed.

The various objects and advantages of my invention will be more apparent upon considering the following detailed description of certain embodiments thereof which description applies to the apparatus shown in the accompanying drawings in which Fig. 1 is a side elevation of one form of my improved apparatus for applying a precoiled ribbon to a metal tube;

Fig. 2 is a plan view of the apparatus shown in Fig. 1;

Fig. 3 is a left end elevation of the apparatus shown in Figs. 1 and 2;

Fig. 4 is a transverse section view taken on line 4—4 of Fig. 2;

Fig. 5 is a longitudinal section view of a portion of the tailstock and of an expansible collet secured to the driving spindle;

Fig. 6 is an enlarged side elevation of the expansible collet;

Fig. 7 is a transverse section view taken on line 7—7 of Fig. 6;

Fig. 8 is a transverse section view of the apparatus shown in Fig. 2, Fig. 8 being taken on line 8—8 of Fig. 2;

Fig. 9 is an end elevation of the tool heads, taken on line 9—9 of Fig. 2;

Fig. 10 is a longitudinal section view of the tool heads taken on line 10—10 of Fig. 8;

Fig. 11 is a diagonal section view of the tool heads taken on line 11—11 of Fig. 14;

Fig. 12 is a diagonal section view of the tool heads taken on line 12—12 of Fig. 14;

Fig. 13 is a transverse section view showing the clip for securing a portion of the metal ribbon to the tube, taken on line 13—13 of Fig. 10;

Fig. 14 is an enlarged elevation of the tool head shown in Fig. 4;

Fig. 15 is a longitudinal section view of one of the tool heads, taken on line 15—15 of Fig. 14;

Fig. 16 is a transverse section view of one of the tool heads taken on line 16—16 of Fig. 14;

Fig. 17 is an enlarged perspective view of one of the ribbon guides shown in Figs. 14 and 16;

Fig. 18 is a fragmentary side elevation of another embodiment of my invention comprising apparatus for simultaneously coiling the metal ribbon and applying the same to the tube.

Fig. 19 is an end elevation of the tool heads shown in Fig. 18, the tube being shown in section;

Fig. 20 is a longitudinal section view of one of the tool heads shown in Fig. 19, taken on line 20—20 of Fig. 19.

Fig. 21 is a plan view of part of the adjusting mechanism forming a part of the apparatus shown in Fig. 20;

Fig. 22 is a side elevation, partly in section, of the finned tube, illustrating the method of applying a precoiled metal ribbon to the tube;

Fig. 23 is an enlarged fragmentary section view of the finned tube showing the manner in which the metal ribbon is anchored to the tube and Fig. 24 is an enlarged elevation of the finned tubing illustrating the method of manufacture as performed by the apparatus of Figs. 18 to 21 inclusive.

The apparatus illustrated in Figs. 1 to 17 inclusive is suitable for applying a precoiled metal fin or ribbon to a tube, the partially formed product being shown in Fig. 22. In Fig. 22 I have illustrated a tube 1 of copper, admiralty metal, or the like, and a helical coil of metal ribbon 2, a portion of which is shown anchored to the tube 1. The operation consists of first roughening the surface of the tube as illustrated at 3, then forming a helical groove as shown at 4, whereupon the precoiled metal ribbon is fed into the groove and the edges of the groove are then crimped as shown at 5 to firmly anchor the inner edge of the ribbon to the tube. The precoiled ribbon may be formed in any suitable manner but I prefer to employ the process covered by my aforesaid pending application Serial No. 403,193, filed October 29, 1929 which has since issued as Patent No. 1,878,233. The precoiled ribbon is preferably annealed before it is secured to the tube.

Referring to Figs. 1 and 2 I have illustrated a machine of the lathe type having supports 6 and 7, a bed 8 and a motor 9 for driving a spindle 10 through gears 11 and 12. The motor also drives a lead screw 13 through a train of gears 14. Two cooperating tool heads 15 and 16 are mounted on the lathe bed and the tube 1 is carried between the spindle 10 and the tailstock 10'. The tool heads 15 and 16 are mounted on brackets 17 and 18, respectively, carried by a common carriage plate 19 mounted on the bed 8. The brackets 17 and 18 are slidably mounted on the carriage plate 19 and are adjustable toward and away from each other in the usual manner by a cross feed screw 20 connected to a hand crank 21. The carriage plate 19 is provided with a bracket 22 slidably mounted on a rod 23 (see Fig. 3). The bracket 22 carries a lever 24 having a handle 25 and a threaded shoe 26 engaging the lead screw 13. It will be understood that when the handle 25 is in its lowered position the threaded shoe 26 engages the lead screw 13 and the tool heads then move along the bed as the lead screw 13 is rotated by the motor.

The tailstock shown in Figs. 1, 2 and 5 comprises a frame 27 adapted to be anchored to the bed by means of a set screw 28. The frame 27 carries a sleeve 29 normally forced toward the spindle 10 by a spring 30. A shaft 31 is rotatably mounted in the sleeve 29 by means of suitable bearings 32. The shaft 31 carries a projection 33 adapted to enter the end of the tube 1 on which the metal ribbon is to be secured. The end of the shaft 31 forms an abutment for the end of the tube as shown at 34.

The spindle 10 is provided with an improved expansible collet 35 as best illustrated in Figs. 5, 6 and 7. This expansible collet comprises a sleeve 36 having a split end provided with knurled surfaces 37 adapted to engage the inside of the adjacent end of the tube 1 and an expansion wedge member 38 fits in the end of this split sleeve 36 and is carried by a rod 39 secured to a sliding block 40. This sliding block is mounted within a second sleeve 41 which has a screw-threaded connection 42 with the headstock 10. The sleeve 41 is provided with diametrically opposed slots and the pin 43 passes through the sliding block 40 and projects through these slots in the sleeve 41. The ends of the pin are mounted in a ring 44 surrounding the sleeve 41 and mounted within an annular channel in a second ring 45. This outer ring 45 has a plurality of projections 46 adapted to be engaged by a shifting lever or yoke 47, and it will be understood that by forcing this outer ring to the left as shown in Fig. 5 the wedge member 38 is drawn into the end of the split expansion sleeve 35 to cause the knurled surfaces 37 to grip the inside of the tube 1. Accordingly, when power is supplied to the spindle 10 the expansion sleeve 36 is rotated and this in turn causes the tube 1 to rotate. A friction clutch 48 is interposed between the driving gear 12 and the spindle in accordance with usual practice.

The tool head 16 comprises a support 49 (see Figs. 8, 9 and 10) having a flange 50 bolted to the bracket 18. The support 49 carries a grooving tool 51 and a roughening roll 52. The grooving tool 51 comprises a cutting or grooving member proper 53 and a tool holder 54 to which the tool 53 is secured by a set screw 55. The tool holder 51 is provided with slots for receiving bolts 56 and 57. These bolts are carried by threaded sleeves 58 and 59 mounted in the support 49. An adjusting screw 60 is mounted in the flange 50 with the head 61 of the adjusting screw engaging the end of the tool holder 54. By loosening the nuts on the bolts 56 and 57 the position of the tool holder 54 with respect to the support 49 can be adjusted by manipulating the adjusting screw 60. This adjustment is independent of all other adjustments for the several rolls and accordingly the grooving tool can be adjusted with respect to the several rolls to bring it into proper position to perform its function of scoring a groove in the surface of the tube 1.

The roughening roll 52 is mounted in a holder 62 and this holder is mounted on the support 49 in exactly the same manner as the grooving tool holder. The holder 62 is slotted and normally clamped against the support 49 by bolts 63 and 64 and when it is necessary to adjust the position of the roughening roll 52 the nuts on the bolts 63 and 64 are loosened and an adjusting screw 65 mounted in the flange 50 and abutting against the end of the holder 62 is manipulated to adjust the position of the holder with respect to the support 49. The flange 50 is properly centered on the bracket 18 by means of a projection 66 fitting into a corresponding opening in the bracket.

The tool head 15 comprises a support 67 having a flange 68 secured to the bracket 17 by bolts 69 and 70, the flange being properly centered on the bracket by virtue of a projection 71 fitting into a corresponding recess in the face of the bracket. The tool head 15 carries the lead rolls 72 and 73 and the knurling rolls 74 and 75. The lead roll 72 is rotatably mounted in a holder 76 and this holder is normally clamped against the support 67 by bolts 77 and 78. These bolts pass through slots in the holder 76 and through threaded sleeves 79 and 80 carried by the support 67. An adjusting screw 81 is provided in the support 67 and has a tapered end engaging a corner of the holder 76. Accordingly, the position of the roll 72 can be adjusted by loosening the nuts on the bolts 77 and 78 and manipulating the adjusting screw 71.

The lead roll 73 is rotatably mounted in a holder 82 and this holder is normally clamped against a side plate 83 by means of bolts 84 and 85 passing through slots in the holder 82 and through threaded sleeves 86 and 87 mounted in the side plate 83. An adjusting screw 88 is provided in the side plate 83 and whenever it is necessary to adjust the lead roll 73 the nuts on the bolts 74 and 75 are loosened and the adjusting screw 88 turned in the desired direction to provide for the necessary displacement of the holder 82 with respect to the side plate 83. The tapered end of the adjusting screw 88 engages the rear corner of the holder 82 and is therefore adapted to slide the holder 82 along the side plate 83. The side plate 83 is carried on a shaft 89 having a handle 90 at one end thereof and a screw-threaded portion 91 at the other end thereof. The screw-threaded portion engages a threaded hole in the support 67. A pair of lugs, one of which is shown at 92 in Fig. 15, are provided on the side plate 83 and fit into corresponding recesses in the support 67. Adjusting screws 94 and 94' are provided in the support 67 and engage the ends of the projections 92 (see Fig. 14). A second pair of lugs, one of which is shown at 93, in Fig. 15, are provided on the side plate 83 and fit into corresponding recesses in the support 67. Adjusting screws 95 and 95' are provided in the support 67 and engage the ends of the projections 93 (see Fig. 14). It will be understood that the distance between the lead rolls 72 and 73 can be adjusted by manipulating the handle 90 on the shaft 89, and the adjusting screw 94, 94', 95 and 95'. For example, if the lead rolls 72 and 73 need to be separated to accommodate a thicker ribbon, then the shaft 89 can be turned by means of the handle 90 to separate the side plate 83 from the support 67 to thus bring the lead rolls into the proper relative positions. The screws 94, 94', 95 and 95' can then be tightened against the projections 92 and 93 to hold the side plate 83 and the support 67 in the proper position.

The knurling roll 74 is rotatably mounted in a holder 96 (see Figs. 15 and 16) and this holder is normally clamped against the inner face of the support 67 by bolts 97 and 98 (see Fig. 14). These bolts pass through slots in the holder 96 and through threaded sleeves 99 and 100 mounted in the support 67. In like manner the knurling roll 75 is rotatably mounted in a holder 101 and this holder is normally clamped against the inner face of the side plate 83 by bolts 102 and 103. These bolts pass through slots in the holder 101 and through threaded sleeves 104 and 105 mounted in the side plate 83. The adjustment of the roll 75 is secured by loosening the nuts on the bolts 102 and 103 and then manipulating an adjusting screw 106 (see Figs. 14 and 16). In like manner the position of the knurling roll 74 can be adjusted by first loosening the nuts on the bolts 97 and 98 and then manipulating the adjusting screw 107.

A pair of ribbon guides 108 and 109 serve to guide the ribbon into the groove in the surface of the tube. The guide 108 is fastened to the support 67 by a screw 110 and the guide 109 is fastened to the side plate 83 by a screw 111. Each of these guides is of the form illustrated in Fig. 17 where I have shown the ribbon guide 109. This guide comprises a support 112 having a slot therein to receive the screw. A shank on the end of this support is provided with a curved surface 113 to accommodate the lead roll 73 and a corresponding curved surface 114 to accommodate the knurling roll 75. There is also a curved surface 115 at the end of this shank machined to conform with the curvature of the tube 1. These ribbon guides are easily removable and can be replaced by similar guides having the surface 115 shaped to conform with the curvature of tubes of different sizes.

In Fig. 13 I have illustrated a spring clip 116 which can be used for the purpose of holding one edge of the ribbon 2 in contact with the tube 1 until the operation of the machine has proceeded to a point where a portion of the ribbon is embedded in the surface of the tube. Thereafter it is not necessary to use the clip.

The apparatus illustrated in Figs. 1 to 17 inclusive is particularly suitable for applying to a tube a preformed helical coil of thin metal ribbon. This coil of metal ribbon, whether of copper or other ductile metal, is first placed on the tube and the tube is then mounted between the spindle 10 and the tailstock with the expansible collet gripping the end of the tube adjacent the headstock. The spring clip 116 is then applied to the end of the ribbon and the machine is started. The roughening roll 52 first roughens the surface of the tube to facilitate the subsequent scoring or grooving operation. The stationary grooving tool 53 presses the groove into the surface of the tube, the groove having raised edges and being of sufficient width to accommodate the edge of the metal ribbon which is fed into the groove by the rotation of the tube and the guiding action of the lead rolls 72 and 73 and the ribbon guides 108 and 109. The knurling rolls 74 and 75 then crimp the edges of the groove against the sides of the ribbon to anchor the inner edge of the ribbon firmly to the tube. As this operation proceeds the tool heads move along the bed due to the action of the lead screw and accordingly the coiled ribbon is anchored to the tube in the form of a helix. The utility of the apparatus is due in large measure to the fact that the tube is adequately supported at all times during the operation of applying the fin to the tube. The grooving tool and the lead rolls and knurling rolls form a three-point support for the tube and the roughening roll can then be brought into proper relation to the tube by adjusting the holder for the roughening roll. The action of the roughening roll greatly facilitates the scoring or grooving operation.

The apparatus shown in Figs. 18 to 21 inclusive is similar in many respects to that previously described. This apparatus is however modified to the extent necessary to handle a ribbon that is not previously coiled. In Fig. 18 I have illustrated the lathe bed 8, the lead screw 13, the tailstock 27 and the spindle 10. The tube 1 is mounted between the spindle 10 and the tailstock in the manner previously described. A tool carriage plate 19 is provided with a support 117 that carries a spool of metal ribbon 118. This metal ribbon is fed to the tool heads 16' and 17'. The construction of the tool head 16' is similar in all respects with the construction of the tool head 16 previously described, the same reference characters having been applied. The construction of the tool head 17' is similar to that of the tool head 17 previously described except for the provision of a tension roll adapted to engage the outer edge of the ribbon to assist in the operation of coiling the ribbon 2 around the tube 1, and one of the lead rolls is cut away to accommodate the tension roll. I have designated this lead roll by the reference character 73' and by referring to Fig. 20 it will be noted that the tension roll 119 is mounted in the space provided by this cutaway portion of the lead roll 73'. The tension roll 119 is rotatably mounted in an eccentric bearing 120. An adjusting arm 121 is secured to this eccentric bearing and can be moved to any one of a number of adjusted positions determined by the teeth 122 on an adjustment plate secured to the side plate 83 by means of a screw 124.

The manner of applying ribbon to the tube by means of the apparatus shown in Figs. 18 to 21 inclusive is illustrated in Fig. 24 which shows the straight ribbon 2 being fed into the groove formed in the tube 1. As the tube 1 is rotated in the manner previously described the roughening roll roughens the surface of the tube as indicated at 3, the grooving tool then forms a groove 4, the ribbon is fed into the groove and thereafter the edges of the groove are crimped against the sides of the ribbon to anchor the same to the tube. The joint formed between the ribbon and the tube is best illustrated in Fig. 23 which shows the edges of the groove crimped against the sides of the inner edge of the ribbon 2 and where the ribbon is of ductile material this action may serve to compress the ribbon to such an extent that it is somewhat narrower at this point than is the case with that portion of the ribbon that is not embedded in the surface of the tube.

It is to be understood that my invention is not limited to the particular embodiments illustrated and described but includes such modifications thereof as fall within the scope of the appended claims.

The improved apparatus herein described is disclosed and claimed in my copending application, Serial Number 619,215.

I claim:—

1. The method of forming a finned tube which comprises forming an edgewise wound coil of metal ribbon, inserting a metal tube into said coil, forming a helical groove about said tube, inserting the metal ribbon edgewise into said groove, and progressively crimping the edges of the groove to cause the same to grip the metal ribbon.

2. The method of forming a finned tube which comprises forming an edgewise wound coil of metal ribbon, annealing the coiled ribbon, inserting a metal tube into said coil, forming a helical groove about said tube, inserting the metal ribbon edgewise into said groove, and progressively crimping the edges of the groove to cause the same to grip the metal ribbon.

3. The method of forming a finned tube which comprises forming an edgewise wound coil of metal ribbon, inserting a tube into said coil, forming a helical groove about said tube, securing a portion of said coil with respect to said tube, turning said tube with respect to the unsecured portion of the coil to draw the same progressively into said groove and anchoring the ribbon in said groove.

4. The method of forming a finned tube which comprises displacing a portion of the metal at the outer surface of a metal tube to form a groove having raised edges, inserting a metal ribbon edgewise into said groove and crimping the edges of the groove to cause the same to grip the metal ribbon.

EDWARD A. DEWALD.

CERTIFICATE OF CORRECTION.

Patent No. 2,004,387.  June 11, 1935.

EDWARD A. DEWALD.

It is hereby certified that error appears in the printed specification of the above numbered patent requiring correction as follows: Page 1, first column, line 15, for the patent number "1,898,233" read 1,878,233; and that the said Letters Patent should be read with this correction therein that the same may conform to the record of the case in the Patent Office.

Signed and sealed this 16th day of July, A. D. 1935.

Leslie Frazer (Seal)  Acting Commissioner of Patents.